United States Patent [19]

Mitchell et al.

[11] 4,325,824

[45] Apr. 20, 1982

[54] UNHOOKING DIRTY FILTER ALARM

[75] Inventors: Samuel S. Mitchell, Monroeville; Abbas F. Vijlee, Pittsburgh, both of Pa.

[73] Assignee: Schroeder Brothers Corporation, McKees Rocks, Pa.

[21] Appl. No.: 247,936

[22] Filed: Mar. 26, 1981

[51] Int. Cl.³ .............................................. B01D 27/10
[52] U.S. Cl. ...................................... 210/90; 116/70; 210/91
[58] Field of Search ........................... 210/90, 91, 100; 116/70

[56] References Cited

U.S. PATENT DOCUMENTS

| 3,150,633 | 9/1964 | Holl | 210/90 |
| 3,410,411 | 11/1968 | Dence | 210/100 |
| 3,487,929 | 1/1970 | Samale et al. | 210/91 X |
| 3,491,077 | 3/1976 | Moore | 116/70 |
| 3,950,248 | 4/1976 | Brown et al. | 210/90 |

Primary Examiner—John Adee
Attorney, Agent, or Firm—Webb, Burden, Robinson & Webb

[57] ABSTRACT

An unhooking dirty filter alarm for a filter comprising a filter head, canister and tubular filter element. The filter head has a bypass valve therein. Linkages to the outside of the filter element rotate a pointer indicating whether or not the filter element has been bypassed. The linkages are arranged not to restore the pointer after the bypassing condition has abated to thereby latch the information that the filter was bypassed.

5 Claims, 11 Drawing Figures

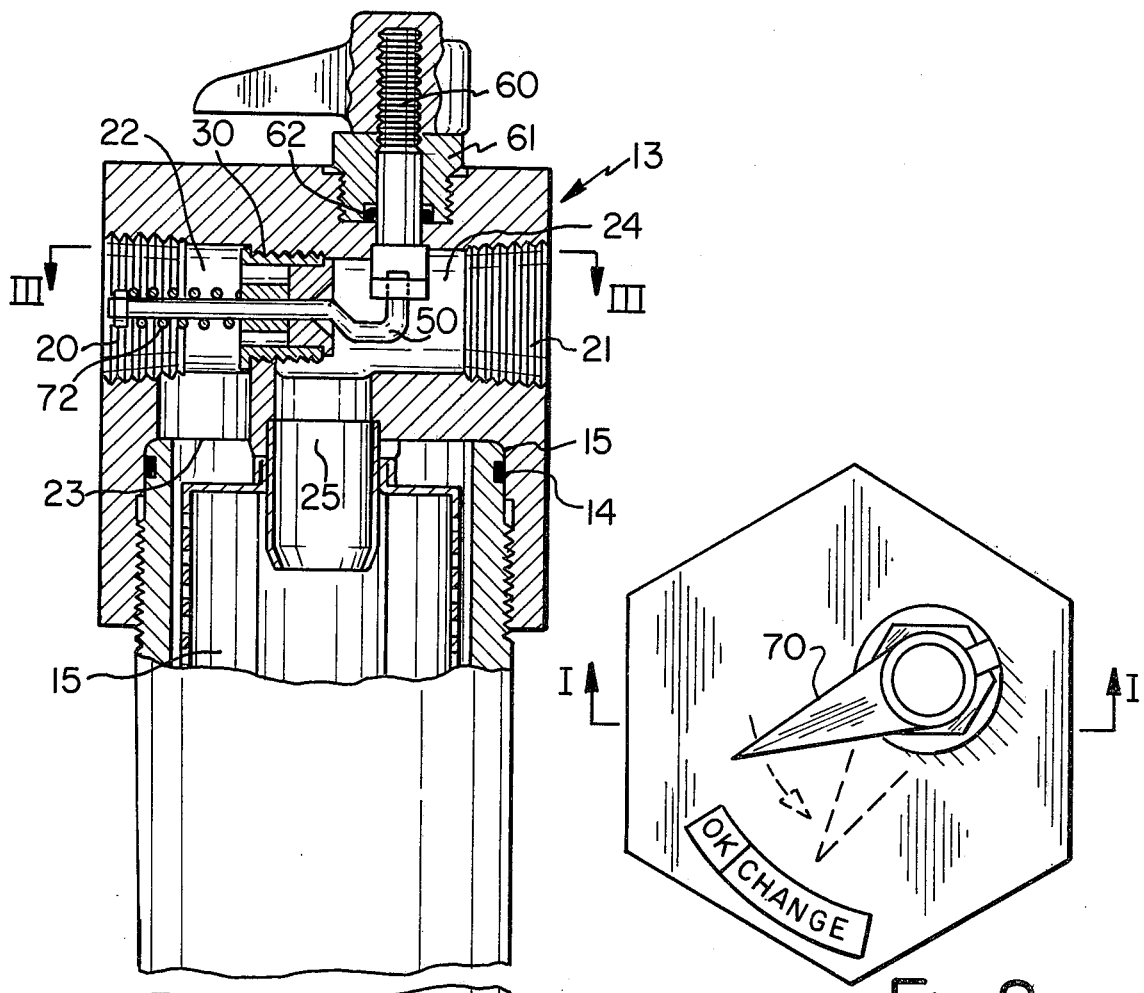
Fig. 1
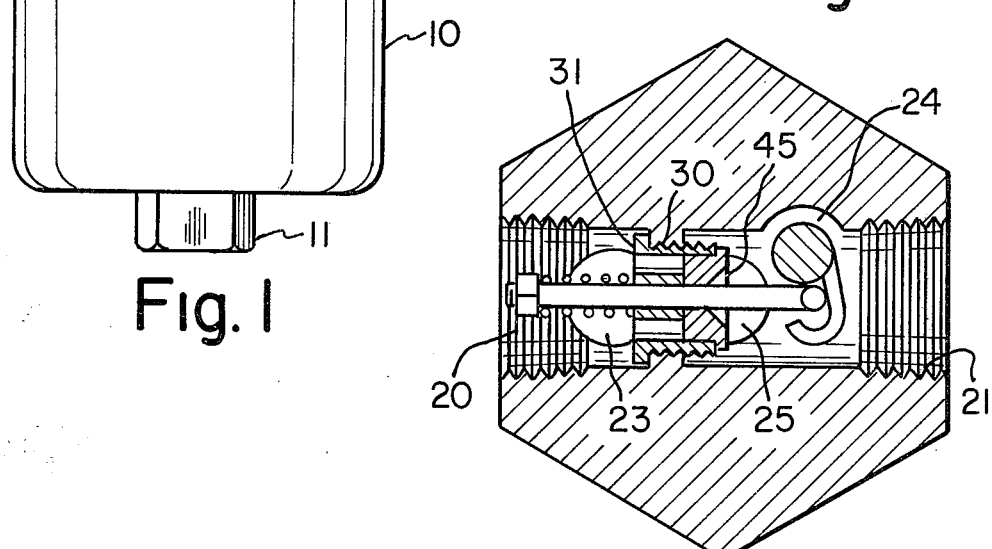
Fig. 2
Fig. 3

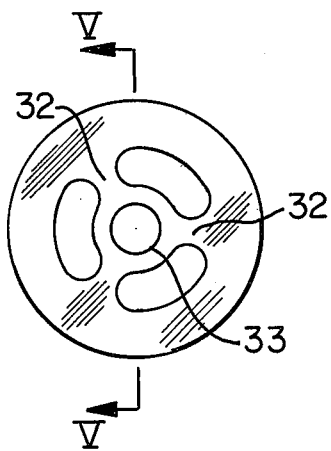
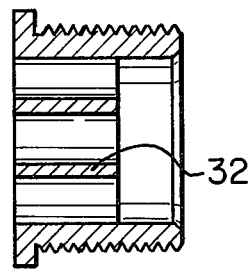
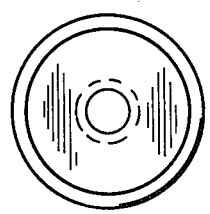
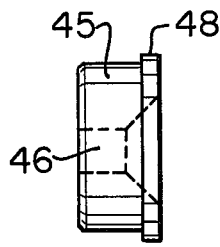
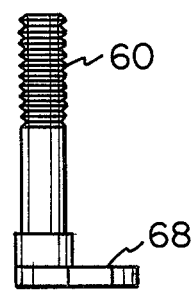
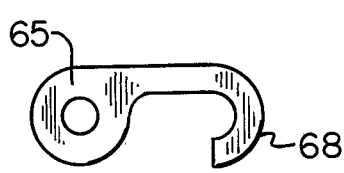
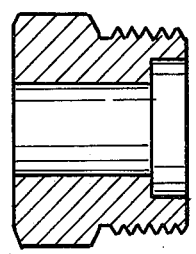

UNHOOKING DIRTY FILTER ALARM

BACKGROUND

Typically hydraulic systems require filtration to preserve the cleanliness of the hydraulic fluid. Otherwise, components of the hydraulic system deteriorate and fail. During usage, filters scavenge foreign matter (dirt) and eventually begin to clog up. The pressure drop across the filter element for a given flow rate increases with the dirtiness of the filter element. Generally the filter is provided with a bypass valve that permits the bypass of the filter element when the pressure drop across the element reaches a desired limit. In this way, the hydraulic system can continue to function but, of course, unfiltered fluid is permitted to circulate. Since the filter is completely encapsulated, the filter element cannot be directly observed.

In the past, indicators have been provided to show when a bypass valve is open and/or to indicate a pressure drop across the filter. See U.S. Pat. No. 3,150,633. The prior art indicators do not indicate the filter condition but rather indicate the instantaneous pressure drop across the filter. The pressure drop is dependent upon the flow through the filter, the viscosity of the fluid and the cleanliness of the filter element. Since the flow in the hydraulic system is variable and the temperature of the fluid is variable (cold at start-up; warm after operation) the bypass first opens during surges at startup. Unless the pressure indicator is being observed at this time, the dirty condition of the filter and the fact that unfiltered fluid had been circulated is lost.

As with any apparatus, a dirty filter element indicator must have a minimum of parts. It must be inexpensive to manufacture. It must be rugged.

According to this invention, there is provided a filter condition indicator that latches the maximum pressure across the filter or latches the information that during surges unfiltered fluid has been circulated in the system. It is not necessary for an observer to position himself near the filter indicator during the start-up in order to know later whether or not the filter had been bypassed. It may even be dangerous to position oneself near the filter indicator while the equipment is being operated.

SUMMARY OF THE INVENTION

Briefly according to this invention there is provided a filter comprising a filter head, a canister secured to the filter head, and a tubular filter element positioned within the canister. The filter head comprises inlet and outlet ports and passages for delivering the fluid from the inlet port to the outer cylindrical surface of the tubular filter element and for delivering fluid from the interior of the filter element to the outlet port. The filter head has a normally closed bypass valve in a channel between the inlet and outlet ports. The bypass valve comprises an insert within the channel having a cylindrical inner wall. A spider including a hub and radial legs is snuggly fit within the cylindrical wall. The hub of the spider has an axial guideway therein into which a piston rod is slidably journaled. A helical spring surrounds the rod and is secured at one end of the rod by a head and bears against the hub at the other end. A piston is positioned within the inner cylindrical wall and is fixed to the piston rod. The piston can move against the spring bias by the force of the differential pressure across the piston and if sufficiently moved will open a flow path directly between inlet and outlet channels. The rod has an extension with a bend therein to form a generally perpendicular presser foot. The filter head has a pointer shaft journaled therein being perpendicular to the axis of the piston and offset therefrom. A hooked crank arm extends from the pointer shaft. The crank arm extends across the travel path of the presser foot. When the piston rod moves axially, it causes the crank arm to rotate if the presser foot presses against the crank arm. The pointer shaft extends through the filter head to the exterior of the filter head and has a pointer secured thereto and fixed in angular relation to the crank arm.

THE DRAWINGS

FIG. 1 is a side view and partial section of a filter with indicators according to this invention, the section is taken along lines I—I of FIG. 2;

FIG. 2 is a top view of the filter;

FIG. 3 is a section taken along lines III—III in FIG. 1;

FIG. 4 is an axial end view of a part of the filter condition indicating mechanism referred to herein as the spider;

FIG. 5 is a section view of the part shown in FIG. 4 sectioned along lines V—V;

FIG. 6 is a section view of the part of the filter condition indicating mechanism referred to herein as the piston;

FIG. 7 is a side view of the part shown in FIG. 6;

FIG. 8 is a side view of the part referred to herein as a piston pin;

FIG. 9 is a side view of a part of the filter condition indicating mechanism referred to as the crank and crank pin;

FIG. 10 is an end view of the crank and crank pin shown in FIG. 9; and

FIG. 11 is a section view of a part of the filter condition indicating mechanism referred to herein as the plug.

DESCRIPTION OF THE PREFERRED EMBODIMENT

Referring now to FIG. 1, there is illustrated a filter comprising a tubular canister 10 having a nut fitting 11 at the lower end enabling the canister to be turned with a wrench. The upper exterior cylindrical wall of the canister is threaded. Thus the canister is secured to the filter head 13 by threads and sealed to the filter head by O-ring 14. A tubular filter element 15 is positioned in the canister coaxial therewith. The tubular filter has a sealed lower end not shown. The flow of oil through the tubular filter elements cylindrical walls must continue upward out of the upper axial end thereof.

The filter head has a large bore 15 with external threads at the lower end thereof to enable threaded engagement with the canister 10. The filter head 13 has an internally threaded inlet port 20 and an internally threaded outlet port 21. Thus the filter head can be placed in a hydraulic circuit to deliver fluid from the inlet port to the outlet port passing through the filter element. A passage 23 leads from a channel 22 in communication with the inlet port 20 to the space between the filter element and the interior wall of the canister. A second passage 25 communicates with the interior of the filter element and a channel 24 leading to outlet port 21.

A normally closed bypass valve is positioned in a channel between passage 22 and passage 25. The valve comprises a sleeve 30 held in the channel by external threads. Press fit into the sleeve on the inlet side thereof is a spider 31 (see FIGS. 4 and 5). The spider has an external cylindrical surface sized to snuggly fit into the internal surface of the sleeve. Legs 32 support a hub having an axial passage 33 therein for journalling the piston pin 40 to be described. The spider has a peripheral flange 3 at one axial end thereof to limit its axial travel to prevent it from entering the sleeve beyond the desired distance. Preferably the spider is fabricated from a plastic such as Du Pont's DELRIN 8010 which is a high strength acetol molding resin. It is preferably glass reinforced.

Referring now to FIGS. 6 and 7, the closure member of the bypass valve is a piston 45 which sealably fits into the opposite end of the sleeve from the spider. The piston comprises a cylindrical plug that has a chamfer axial bore 46 for receiving a piston pin 50 (to be described next) and a peripheral flange 48 to restrict the axial movement of the piston beyond the desired distance into the sleeve. Preferably, the piston is fabricated of a free machining steel such as AISI 12L14/15 or Leadloy 300.

Referring now to FIG. 8, piston pin 50 may be manufactured from a carbon steel wire. At one end are threads 51. At the other end is a short section 52 perpendicular to the shank 53. The short section comprises a presser foot. The perpendicular relationship between the short section and the shank is critical and must hold.

The piston pin 50 is slidably journaled in the hub of the spider and is passed through and is potted or brazed to the piston 45 to prevent relative axial movement. The piston 45 is thus intermediate the ends of the piston pin 50.

A pointer shaft 60 (see FIG. 9) passes up through the top of the filter head passing through bushing 61 (FIG. 11). An O-ring 62 seals the shaft and bushing preventing leakage around the shaft. A hooked crank pin 65 (see FIG. 10) is brazed or welded to the pointer shaft. The axis of the pointer shaft 60 is offset from the axis of the piston pin 50, and, therefore the crank pin is long enough to extend into the path of the perpendicular short section (presser foot) of the piston pin. When the piston pin moves against the crank the pointer shaft is rotated within the bushing. Once sufficiently rotated, the hook end 68 of the crank pin clamps the piston pin from continued axial movement. A pointer 70 is fastened to the external end of the pointer shaft.

A helical spring 72 is coaxially positioned over the shank 53 of the piston pin. The spring on one end bears upon the spider 31 and on the other end bears upon the threaded cap turned upon the threaded end of the piston pin. In this way, the piston pin and piston are biased into the no bypass position.

The pointer 70 is secured to the pointer shaft in an established angular relation to the crank pin such that observation of the pointer enables knowledge of the position of the crank arm or pin. Indicia may be placed in the top of the filter head, which when compared to the pointer position enables the quick determination of the location of the crank arm.

The bypass valve and indicator work as follows: under normal conditions of warm fluid and clean filter element, the spring in the bypass valve holds the valve closed even during surges. The pointer 70 can be rotated with the pointer shaft 60 and the crank arm 65 can be brought to engage the short arm 52 with mere finger pressure. The pointer 70 is then directed to indicia on the top of the filter head indicating that the filter element has acceptable cleanliness. As the filter element gathers dirt, the pressure drop for a given flow and oil temperature increases and the likelihood that the filter will be bypassed (especially at start-up when the flow is cold) is increased. When the pressure drop across the filter element is sufficient to overcome the spring bias, the crank arm 65 is pushed by the presser foot and the pointer is rotated to a position indicating that the filter has been bypassed. Now the bypass valve can close again, for example as the oil heats up, and the pressure drop decreases across the filter element. However, the pointer remains pointing to the bypassed condition. Withdrawal of the piston pin does not pull back the crank arm. Thus the fact that the filter was bypassed is not lost. If the pointer can be manually returned to the no bypass position the operator knows he can continue to operate until a suitable opportunity for replacing the filter element.

Having thus described the invention with the detail and particularity required by the Patent Laws, what is desired protected and claimed by Letters Patent is set forth in the following claims:

1. A filter comprising
   a filter head;
   a canister secured to the filter head;
   a tubular filter element positioned within the canister;
   said filter head comprising inlet and outlet ports for connecting into a hydraulic conduit, passages for delivering fluid from the inlet port to the outer cylindrical surface of the tubular filter element and for delivering fluid from the interior of the filter element to the outlet port;
   said filter head having a normally closed bypass valve and a channel between the inlet and outlet ports;
   said bypass valve comprising a closure element that is spring biased in the closed position which bias can be overcome by differential pressure across the filter element;
   a piston pin fixed to said closure element having an extension with a bend therein to form a generally perpendicular presser foot;
   said filter head having a pointer shaft journaled therein being perpendicular to the axis of said piston pin and offset from said axis, crank extending from said pointer shaft extending across the travel path of said presser foot such that when the closure element moves axially it causes the pointer shaft to rotate if the presser foot presses against upon the crank arm;
   said pointer shaft extending through the filter head to the exterior whereby rotation of the rod may be observed.

2. A filter according to claim 1 comprising a pointer attached to the pointer shaft external of the filter head.

3. A filter according to claim 2 comprising indicia on the top of the filter head which, in cooperation with the pointer indicates the maximum differential pressure across the valve since the pointer was reset.

4. A filter according to claim 1 in which the crank has a hooked end in which the presser foot nests when the closure element has been pushed open, this thus restricting continued axial movement of the pressure foot toward the crank.

5. A filter comprising
   a filter head;
   a canister secured to the filter head;
   a tubular filter element positioned within the canister;

said filter head comprising inlet and outlet ports for connecting into a hydraulic conduit, passages for delivering fluid from the inlet port to the outer cylindrical surface of the tubular filter element and for delivering fluid from the interior of the filter element to the outlet port;

said filter head having a normally closed bypass valve and a channel between the inlet and outlet ports;

said bypass comprising an insert within the channel having a cylindrical wall and a spider including a hub supported by radial legs positioned at one end of the cylinder;

said hub of said spider having an axial guideway therein, a piston rod slidably positioned in said guideway, a helical spring surrounds said rod and being secured at one end to the rod and at the other end abutting the hub, a piston positioned within said cylindrical wall and fixed to said rod whereby the piston can move against the spring bias under the differential pressure across the filter element to permit flow directly between inlet and outlet ports;

said piston pin having an extension with a bend therein to form a generally perpendicular presser foot;

said filter head having a pointer shaft journaled therein being perpendicular to the axis of said piston pin and offset from said axis, a hooked crank extending from said pointer shaft extending across the travel path of said presser foot such that when the piston moves axially it causes the pointer shaft to rotate if the presser foot presses against the hooked crank;

said pointer shaft extending through the filter head to the exterior whereby rotation of the rod may be observed.

* * * * *